Patented July 11, 1944

2,353,209

UNITED STATES PATENT OFFICE 2,353,209

DIACETONE COMPOSITION

Sophia O. Williams, Chicago, Ill.

No Drawing. Application March 5, 1941,
Serial No. 381,895

8 Claims. (Cl. 252—73)

This invention relates to a diacetone composition and more particularly to a diacetone composition which has been stabilized against the effect of heat and cold.

This application is a continuation-in-part of my co-pending applications Serial No. 298,693, filed October 9, 1939, and Serial No. 311,681, filed December 29, 1939.

Diacetone (diacetone alcohol $$(CH_3)_2C(OH)CH_2COCH_3)$$

is an inexpensive organic material of high boiling point, low freezing point, and moderate viscosity. When mixed with distilled water, it will produce a low freezing mixture, but on mixture with ordinary tap water, the composition is unstable and tends to separate at temperatures slightly below 32° F. Moreover, the diacetone is unstable at high temperatures and breaks down to give a variety of decomposition products including acetone.

By means of the present invention diacetone is stabilized against decomposition at temperatures at least up to the boiling point of water, and furthermore diacetone-water mixtures are stabilized against separation at the freezing point of water.

This stabilization is accomplished by inclusion in the diacetone system of a buffering agent in sufficient quantity to produce a pH of not substantially more than 7.8 and preferably not below 4. The preferred range of pH is between 5.2 and 6.8.

Any suitable buffering system may be employed which will produce a buffered system of reasonable capacity in the ranges indicated.

The preferred system consists of a mixture of a polycarboxylic acid and an alkali metal salt of a polyvalent acid within the specified pH range of 4 to 7.8. For example, a very efficient and inexpensive system may be prepared by combining citric acid and disodium phosphate in proportions suitable for producing buffer mixtures of the above specified pH range. Similarly, metal salts of phthalic acid may be employed in combination with disodium phosphate or by themselves. Likewise, the system of potassium carbonate and butyric acid may be employed, although it is preferred to use alpha hydroxy isobutyric acid in place of n-butyric acid. The butyric acid-potassium carbonate system, however, has less capacity as a buffer; and for this practical reason other buffer systems of greater buffering capacity are preferred.

The following are examples of effective buffering systems.

I 0.1 molal citric acid _____ c.c.__ 36.8
0.2 molal disodium phosphate _____ c.c.__ 63.2

The above mixture was added to diacetone at the ratio of 1 part of the buffer to 3 parts of diacetone, and the mixture had a pH of 6.42 at room temperature. The temperature coefficient of pH was negligible.

II 0.1 molal citric acid _____ c.c.__ 61.5
0.2 molal disodium phosphate _____ c.c.__ 38.5

This buffer was mixed with diacetone at the ratio of 1 part buffer to 3 parts diacetone and the mixture had a pH of 5.4.

III 0.27 molal potassium acid phthalate __ c.c.__ 25
0.2033 molal NaOH _____ c.c.__ 0.20
Water to make _____ c.c.__ 100.00

This buffer solution was mixed with diacetone in the ratio of 1 part buffer mixture to 3 parts diacetone, and produced a pH when mixed of 5.59.

IV 0.2 molal potassium acid phthalate __ c.c.__ 25
0.203 molal NaOH _____ c.c.__ 11.63
Water to make _____ c.c.__ 100.00

75 c.c. of this buffer solution was mixed with 225 c.c. diacetone and produced a pH of 7.8 which is approximately the upper limit for stability.

Lower pH's than those noted may be used, but tend to develop polymerization and other side reactions under certain conditions and, therefore, are preferably avoided.

One of the largest potential uses of the diacetone mixture is as anti-freeze solution and it is, therefore, preferred to use solutions fairly close in pH to the neutral point. This effectively decreases the corrosion of the metal parts which would be occasioned if pure diacetone were used in the radiator system. In this connection, however, it is preferred to employ additional corrosion inhibitors such as sulfonated castor oil; sulfonated cottonseed oil; hydroxy-ketones from the liquid phase oxidation of hydrocarbons; polyketohydroxy-carboxylic acids, and their low molecular weight alcohol esters, such as those of methanol.

When buffered as above described, diacetone-water mixtures may be employed satisfactorily and indefinitely in the cooling system of internal combustion engines. When diluted with water, diacetone provides an excellent anti-freeze cooling solution. When buffered as described, the solution of diacetone may be diluted as desired. Furthermore, other anti-freeze materials may be included, provided they are compatible with diacetone. Glycerine is quite satisfactory used in this manner.

The foregoing detailed description has been given for clearness of understanding only, and no unnecessary limitations should be understood therefrom.

What I claim as new, and desire to secure by Letters Patent, is:

1. A composition of matter comprising an aqueous system including diacetone and a pH buffering agent in sufficient quantity to produce a pH not substantially above 7.8.

2. A diacetone composition as set forth in claim 1, in which the buffering agent includes a polyvalent acid radical.

3. A diacetone composition as set forth in claim 1, in which the buffering agent includes a polyvalent acid radical, and in which the buffering agent is included in quantities sufficient to produce a pH between 4 and 7.8.

4. A diacetone composition as set forth in claim 1, in which the pH is maintained between 5.2 and 6.8.

5. An anti-freeze solution consisting essentially of diacetone and water, and including a buffering compound of high capacity in proportion to produce a pH between 4.0 and 7.8

6. An aqueous diacetone composition having a pH between 4 and 7.8 and stabilized by the presence of a buffering agent including a dicarboxylic acid radical and a polyvalent acid radical.

7. An aqueous diacetone composition having a pH between 4 and 7.8 and stabilized by a buffering agent including citric acid and sodium phosphate.

8. An aqueous diacetone composition having a pH between 4 and 7.8 and stabilized by a buffering agent including a phthalic acid radical.

SOPHIA O. WILLIAMS.